(12) United States Patent
Livingston et al.

(10) Patent No.: US 7,416,347 B2
(45) Date of Patent: Aug. 26, 2008

(54) OPTICAL FIBER ARRAY CONNECTIVITY SYSTEM WITH INDICIA TO FACILITATE CONNECTIVITY IN FOUR ORIENTATIONS FOR DUAL FUNCTIONALITY

(75) Inventors: Joseph C. Livingston, Frisco, TX (US); Timothy W. Anderson, Omaha, NE (US); Paul Kolesar, McKinney, TX (US); Richard L. Case, Omaha, TX (US)

(73) Assignee: Commscope Solutions Properties, LLC, Sparks, NV (US)

( * ) Notice: Subject to any disclaimer, the term of this patent is extended or adjusted under 35 U.S.C. 154(b) by 170 days.

(21) Appl. No.: 11/440,622

(22) Filed: May 25, 2006

(65) Prior Publication Data

US 2006/0275007 A1    Dec. 7, 2006

Related U.S. Application Data

(60) Provisional application No. 60/685,977, filed on May 31, 2005.

(51) Int. Cl.
*G02B 6/36* (2006.01)
(52) U.S. Cl. ........................................................ 385/53
(58) Field of Classification Search ........................ None
See application file for complete search history.

(56) References Cited

U.S. PATENT DOCUMENTS

| | | | |
|---|---|---|---|
| 4,611,887 A | 9/1986 | Glover et al. | |
| 4,615,581 A | * 10/1986 | Morimoto | ..................... 385/60 |
| 4,699,460 A | 10/1987 | Szentesi | |
| 5,066,094 A | 11/1991 | Takahashi et al. | |
| 5,155,785 A | 10/1992 | Holland et al. | |
| 5,204,925 A | 4/1993 | Bonanni et al. | |
| 5,267,342 A | 11/1993 | Takahashi et al. | |
| 5,513,293 A | 4/1996 | Holland et al. | |

(Continued)

FOREIGN PATENT DOCUMENTS

EP    1039323 A1    9/2000

(Continued)

OTHER PUBLICATIONS

Revised 1997/98 Catalog, vol. 8.2 1998, New Focus Inc., Santa Clara, XP002404812, p. 129.

(Continued)

*Primary Examiner*—Sung H Pak
(74) *Attorney, Agent, or Firm*—Myers Bigel Sibley & Sajovec

(57) ABSTRACT

A fan-out unit for a data communication system includes: a plurality of optical fibers; and a faceplate with a plurality of ports arranged in at least one row, each of the ports being optically interconnected with a respective one of the optical fibers and configured to received a mating optical fiber. The faceplate includes a first visual indicia associated with the ports that indicates an arrangement in which mating optical fibers are to be inserted into the ports, the first visual indicia being easily readable when the faceplate is in either a first horizontal orientation or a first vertical orientation, but not being easily readable when the faceplate is in a second horizontal orientation that is inverted from the first horizontal orientation or a second vertical orientation that is inverted from the first vertical orientation.

23 Claims, 8 Drawing Sheets

U.S. PATENT DOCUMENTS

| | | | |
|---|---|---|---|
| 5,615,293 | A | 3/1997 | Sayegh |
| 5,867,620 | A | 2/1999 | Bunin et al. |
| 5,943,455 | A | 8/1999 | Travieso et al. |
| 6,078,714 | A | 6/2000 | Cavanaugh |
| 6,219,479 | B1 | 4/2001 | Madden et al. |
| 6,222,976 | B1 | 4/2001 | Shahid |
| 6,224,269 | B1 | 5/2001 | Engstrand et al. |
| 6,243,520 | B1 | 6/2001 | Goldman |
| 6,351,590 | B1 | 2/2002 | Shahid |
| 6,402,393 | B1 | 6/2002 | Grimes et al. |
| 6,421,493 | B1 | 7/2002 | Burek et al. |
| 6,434,316 | B1 | 8/2002 | Grois et al. |
| 6,442,318 | B1 | 8/2002 | Goldman |
| 6,450,701 | B1 | 9/2002 | Cryan et al. |
| 6,464,404 | B1 | 10/2002 | Robinson et al. |
| 6,487,358 | B1 | 11/2002 | Gehrke et al. |
| 6,554,483 | B1 | 4/2003 | Sun et al. |
| 6,597,648 | B1 | 7/2003 | Yeo et al. |
| 6,614,971 | B2 | 9/2003 | Sun et al. |
| 6,619,853 | B2 | 9/2003 | Grois et al. |
| 6,623,173 | B1 | 9/2003 | Grois et al. |
| 6,633,710 | B2 | 10/2003 | Chiarulli et al. |
| 6,663,710 | B1 | 12/2003 | Fujita et al. |
| 6,758,600 | B2 | 7/2004 | Del Grosso et al. |
| 6,905,257 | B2 | 6/2005 | Eichenberger et al. |
| 2002/0150350 | A1 | 10/2002 | Zimmel |
| 2002/0150372 | A1 | 10/2002 | Schray |
| 2003/0133665 | A1 | 7/2003 | Chiu et al. |
| 2004/0042733 | A1 | 3/2004 | Keith et al. |
| 2006/0045457 | A1 * | 3/2006 | Ng et al. ............... 385/134 |

FOREIGN PATENT DOCUMENTS

| | | |
|---|---|---|
| JP | 63167324 | 7/1988 |
| JP | 6118282 | 4/1994 |
| JP | 6347670 | 12/1994 |
| JP | 8005868 | 1/1996 |
| JP | 2001-525557 | 12/2001 |
| JP | 2002-148480 | 5/2002 |
| JP | 2002-148481 | 5/2002 |
| WO | WO 99/28773 | 6/1999 |

OTHER PUBLICATIONS

"Zubehor fur LWL-Kabeinetze Ausgabe 2" 2002, Coming Cable Systems, GMBH & Co. KG, Munchen, XP002404813, pp. 225-229.

International Search Report for PCT/US2006/020726.

International Search Report for PCT/US2006/019210; date of mailing Sep. 29, 2005.

CommScope Company "Systimax® InstaPATCH™ System" 8 pages (2004).

Patterson, Brian T. "From Evolution to Revolution" *Tyco Electronics Fiber Optics Business Unit* (2001).

TIA Engineering Manual 69 pages (1991).

TIA Standard "FOCIS 5 Fiber Optic Connector Intermateability Standard—Type MPO" TIA-604-5B (revision of TIA/EIA-604-5A) 18 pages (Aug. 2002).

TIA/EIA "Guidelines for Maintaining Optical Fiber Polarity with Systems Utilizing MPO (MTP) Connectors" draft copy, to be published as TSB-136 (Apr. 23, 2003).

TIA/EIA "Guidelines for Maintaining Optical Fiber Polarity with systems Utilizing MPO Connectors and 12-Fiber Ribbon Cables" draft copy, to be published as TSB-? 14 pages (Jan. 29, 2002).

* cited by examiner

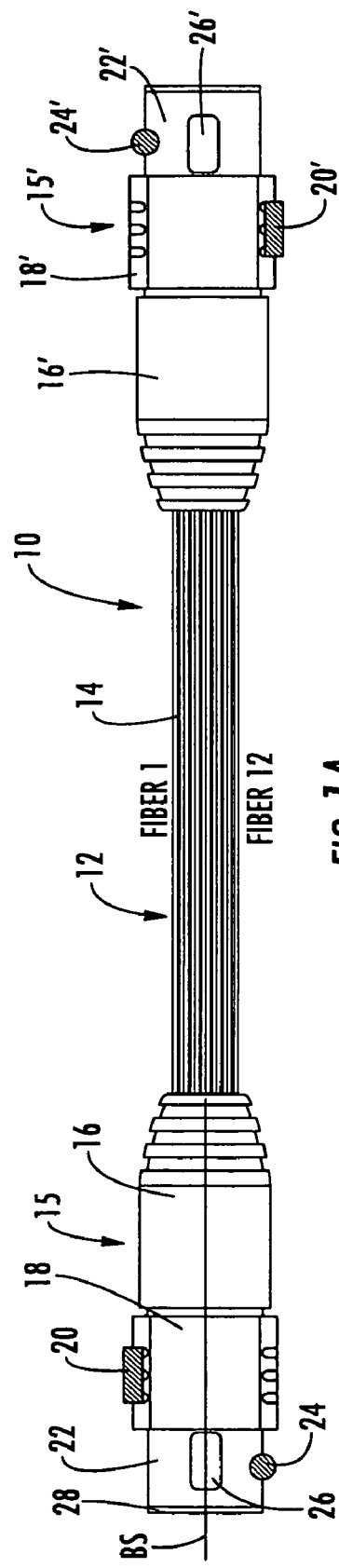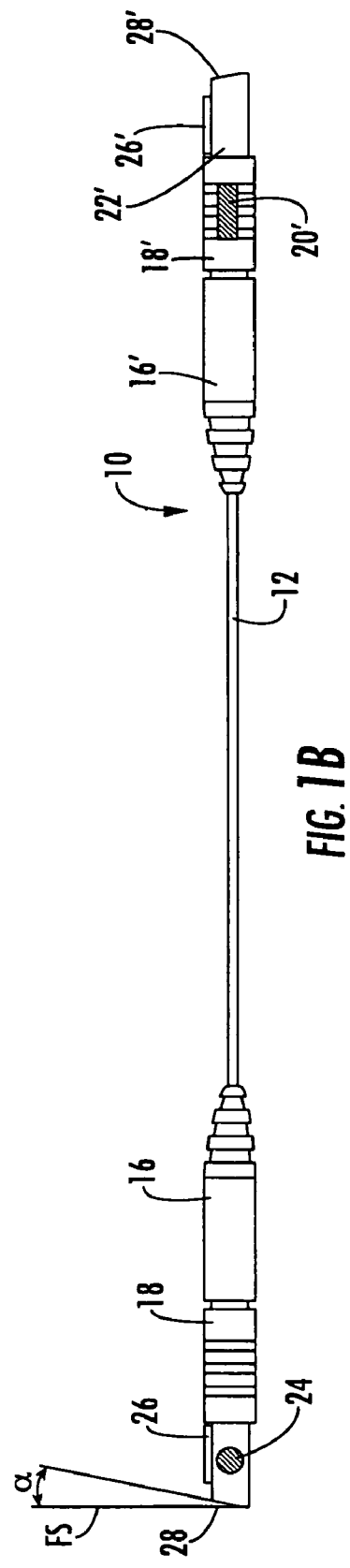
FIG. 1A
FIG. 1B

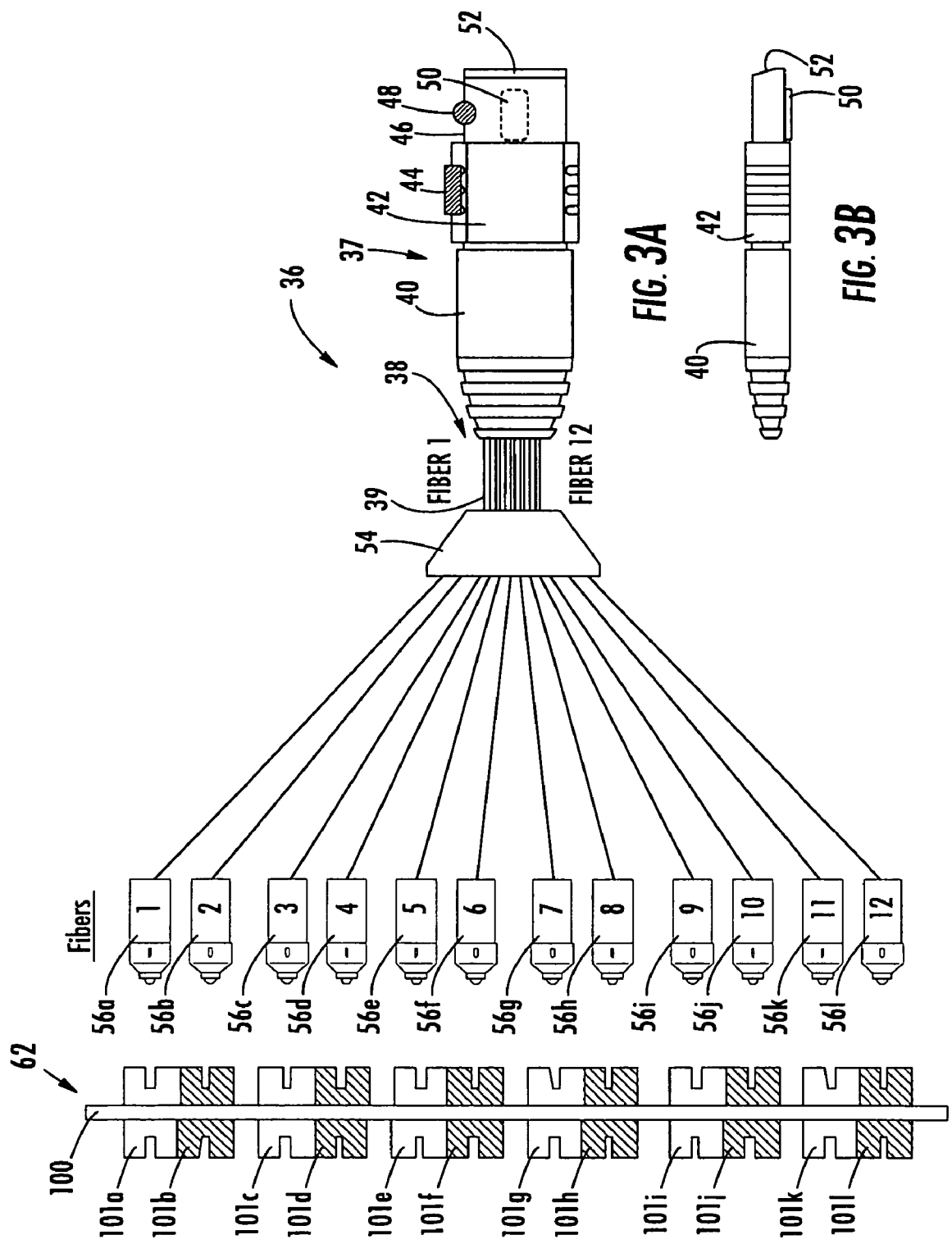

OPTICAL FIBER ARRAY CONNECTIVITY SYSTEM WITH INDICIA TO FACILITATE CONNECTIVITY IN FOUR ORIENTATIONS FOR DUAL FUNCTIONALITY

RELATED APPLICATION

The present application claims priority from U.S. Provisional Patent Application Ser. No. 60/685,977, filed May 31, 2005 and U.S. patent application Ser. No. 11/405,181 (being converted to a Provisional application under MBSS Ref: No. 9457-43PR2), the disclosures of which are hereby incorporated herein in their entirety.

FIELD OF THE INVENTION

The present invention is directed generally to fiber optic ribbon cables, connectors, adapters, and patching systems.

BACKGROUND OF THE INVENTION

Optical fibers are commonly used today for the transmission of signals of all sorts, including communication and data signals. Optical fibers can be single mode fibers (typically employed in long-distance communication), which have only one strong propagation mode, or multi-mode fibers, in which light transmitted in the different modes arrives at different times, resulting in dispersion of the transmitted signal.

Single mode fibers transmit signals between transceivers (i.e., devices that can both transmit and receive optical signals) via pairs of fibers. More specifically, one fiber of the pair will transmit signals from the first transceiver to the second, and the other fiber of the pair will transmit signals from the second transceiver to the first. In this manner, optical signals are not traveling along the same fiber in different directions, as such activity could interfere with both signals.

This pairing arrangement would be fairly simple to organize for two transceiver devices that are permanently optically connected, but in practice transceivers are typically connected through a much larger network of optical fibers, connectors and patch panels. For example, a common optical system includes multiple transceivers at one end, patch cord pairs that are connected to the transceivers and to a duplex adapter mounted on a patch panel, a fan-out unit connected to the duplex adapter that connects to a multi-fiber fiber optic cable (12 fibers per cable is common, and the cable is often in ribbon form) via an array adapter, a second fan-out unit connected to the opposite end of the cable via a second array adapter, and corresponding transceivers connected via patch cord pairs to the second fan-out unit through another duplex adapter. Thus, clearly it is important to be able to track individual optical fibers in the various devices and cables between the transceivers in order to ensure that the individual transceivers are connected as desired.

To ensure intermateability of cabling components and signal polarity, standards have been created to define arrangements of fibers, cables, adapters and connectors. For example, one such standard for array connectors, TIA-604-5B, is directed to MPO fiber optic connector intermateability. Another standard, TIA 568-B.3 with addendum No. 7 written by committee TR-42.8, is directed to maintaining optical fiber polarity with systems using array connectors and adapters, including MPO's. This addendum discusses three different methods of creating an optical path from the transmit side of one transceiver to the receive side of another transceiver. These methods, termed Methods A-C, are intended to "link multiple duplex optical transceiver ports or to link two parallel optics transceiver ports . . . " Systems built using these methods utilize fiber optic cables, adapters, transitions and patch cords that are typically partially or completely unique to one of these methods.

Each of the methods has its own benefits and drawbacks. As such, it may be desirable to provide additional connectivity methods and components suitable for use with such methods.

SUMMARY OF THE INVENTION

The present invention can provide an additional connectivity functionality that simplify the use of cables and other components in fiber optic-based systems. As a first aspect, embodiments of the present invention are directed to a fan-out unit for an optical fiber transmission system. The fan-out unit comprises: a plurality of optical fibers; and a faceplate with a plurality of ports (typically keyed ports) arranged in at least one row, each of the ports being optically interconnected with a respective one of the optical fibers and configured to received a mating optical fiber. The faceplate includes a first visual indicia associated with the ports that indicates an arrangement in which mating optical fibers are to be inserted into the ports, the first visual indicia being easily readable when the faceplate is in either a first horizontal orientation or a first vertical orientation, but not being easily readable when the faceplate is in a second horizontal orientation that is inverted from the first horizontal orientation or a second vertical orientation that is inverted from the first vertical orientation. This configuration can simplify connectivity for an operator connecting the fan-out unit to a data communications system.

As a second aspect, embodiments of the present invention are directed to a data communication system, comprising: first and second transceivers; first and second fan-out units, each of which includes a plurality of optical fibers, wherein the first fan-out unit is optically connected with the first transceiver via a first pair of optical patch cords, and the second fan-out unit is optically connected with the second transceiver via a second pair of optical patch cords; first and second adapters connected with, respectively, the first and second fan-out units; and an optical fiber trunk cable. The optical fiber trunk cable comprises: a plurality of generally parallel optical fibers extending in a longitudinal direction and having first and second ends; and a termination assembly attached at each of the first and second ends of the fibers, each of the termination assemblies connected with, respectively, the first and second adapters. Each of the first and second fan-out units includes a plurality of ports arranged in at least one row, each of the ports being optically interconnected with a respective one of the optical fibers and with a respective one of the patch cords, and wherein each of the first and second fan-out units includes visual indicia that indicates an arrangement in which the patch cords are to be inserted into the ports, the visual indicia indicating that the second fan-out unit is to be optically inverted relative to the first fan-out unit.

BRIEF DESCRIPTION OF THE FIGURES

FIG. 1A is a schematic top view of an embodiment of a ribbon cable of the present invention.

FIG. 1B is a side view of the ribbon cable of FIG. 1A.

FIG. 3A is a schematic top view of an embodiment of a fan-out unit for use with the ribbon cable of FIG. 1A.

FIG. 3B is a side view of the termination assembly of the fan-out unit of FIG. 3A.

DETAILED DESCRIPTION OF EMBODIMENTS OF THE INVENTION

Figure 2:
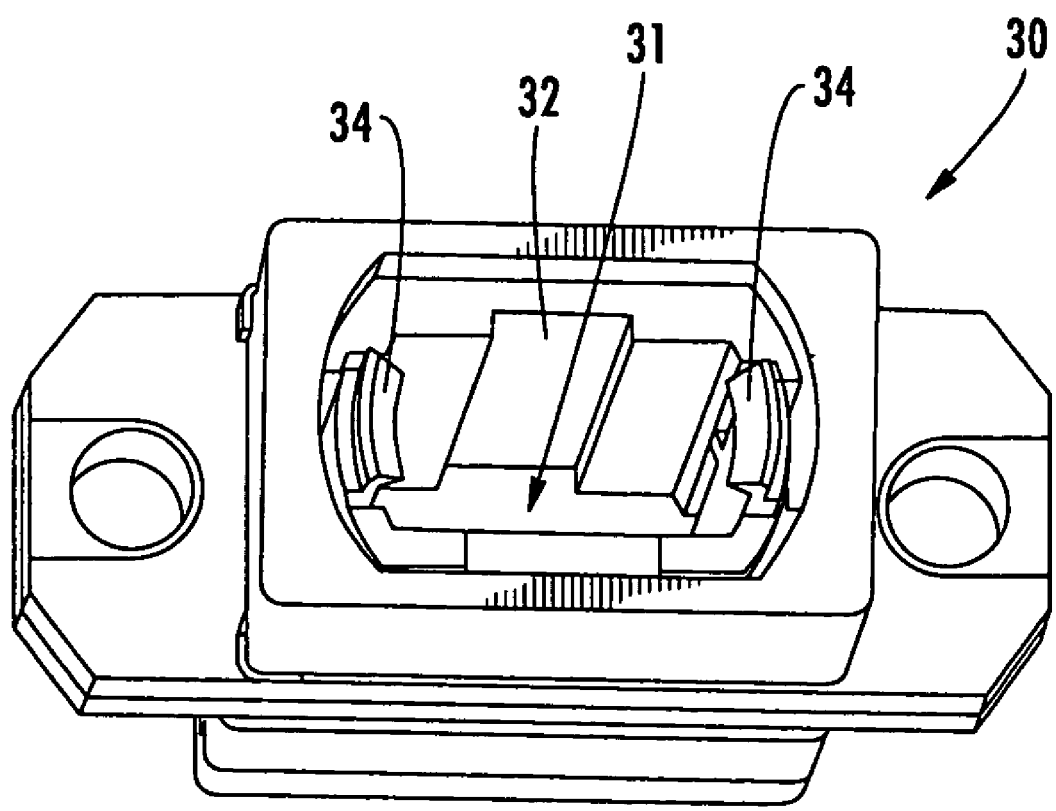
FIG. 2 is a perspective view of an array adapter that can be used with the ribbon cable of FIG. 1A.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout, and the thickness of lines, layers and regions may be exaggerated for clarity.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Referring now to the figures, a fiber optic cable, designated broadly at 10, is illustrated in FIGS. 1A and 1B. The cable 10 includes a ribbon 12 and termination assemblies 15, 15' at either end of the ribbon 12. These components are described in greater detail below.

Referring again to FIGS. 1A and 1B, the ribbon 12 comprises 12 optical fibers 14, each of which has a core and a protective cladding. The fibers 14 are arranged in parallel relationship to form the ribbon 12. It is conventional to refer to the fibers of a ribbon individually as Fiber 1, Fiber 2, etc., for the sake of clarity; in the illustrated ribbon 12, Fiber 1 is nearest the top edge of FIG. 1A, Fiber 2 is below and adjacent Fiber 1, and so on, with Fiber 12 being the lowermost fiber in FIG. 1A. Other conventions associated with the fibers 14 include color and the like and are set forth in TIA/EIA-598, "Optical Fiber Cable Color Coding".

The structure and composition of typical optical fibers is well known to those skilled in this art and need not be described in detail herein. In some embodiments, the optical fibers are single mode fibers. Exemplary optical fibers include TeraSPEED™ fibers, available from SYSTIMAX® Solutions, Inc., Richardson, Tex.

Those skilled in this art will appreciate that cables of different configurations may also be employed. For example, cables having ribbons with different numbers of fibers (6 and 8 fiber ribbons are common) may be used. Also, fiber optic cables of non-ribbon configuration, such as loose tube distribution cables, available from Systimax Solutions, Inc., Richardson, Tex., may also be employed in connection with embodiments of the present invention.

Referring still to FIGS. 1A and 1B, the terminal assembly 15 includes a ferrule 22 that is attached to the ribbon 12, a body 18 that is attached to the ferrule 22, and a boot 16 that is attached to the body 18. The construction and interconnection of the boot 16, body 18 and ferrule 22 are well-known to those skilled in this art and need not be described in detail herein.

Referring once again to FIGS. 1A and 1B, the ferrule 22 includes a contact surface 28 that exposes the fibers 14 to mating fibers in a mating component. The contact surface 28 faces slightly upwardly, angled relative to a plane FS normal to the axes of the fibers 14 at an angle $\alpha$. Typically the angle $\alpha$ is between about 5 and 15 degrees; for example, an angle of 8 degrees is specified in TIA-604-5B for MPO connectors. In other embodiments, the contact surface 28 may be parallel with the plane FS.

Still referring to FIGS. 1A and 1B, the body 18 includes an alignment key 26 on its top surface. The body 18 may also include a body mark 20 (as with the MPO connector shown schematically in FIG. 1A) that identifies for an operator the proper orientation of the body 18 and ferrule 20 for assembly. In the illustrated embodiment, the body mark 20 is on the same side of a bisecting surface BS (which vertically bisects the body 18 and ferrule 22) as the aforementioned Fiber 1. The body mark 20 may be any visual indicia (such as a paint mark) understood by those skilled in this art as being appropriate for identifying the proper orientation of the terminal assembly 15.

Referring still to FIGS. 1A and 1B, the illustrated ferrule 22 includes an optional ferrule mark 24 (as with an MPO connector) that identifies for an operator the proper orientation of the fibers 14 and the ferrule 22 during polishing of the contact surface 28. The ferrule mark 24 is positioned on the ferrule 22 on the side of the bisecting surface BS opposite that of the body mark 20; i.e., on the same side as Fiber 12. The operator is to insert the fibers 14 into the ferrule 22 such that Fiber 12 is on the same side of the ferrule 22 as the ferrule mark 24 (this varies from conventional fiber insertion). Also, this location of the ferrule mark 24 indicates that an operator angle polishing the ends of the fibers 14 will form the contact surface 28 such that it cants or faces slightly upwardly.

Referring yet again to FIGS. 1A and 1B, the terminal assembly 15' includes a boot 16', a body 18' and a ferrule 22' that are similar in construction to the terminal assembly 15. In particular, the key 26' projects upwardly, and the angled contact surface 28' faces slightly upwardly and forms an angle α' with a plane normal to the axes of the fibers 14 as they terminate at the ferrule 22'. The differences between the terminal assembly 15' and the terminal assembly 15 include (a) the placement of the body mark 20' on the side of the ribbon 12 that corresponds to Fiber 12 and (b) the placement of the ferrule mark 24' (if included as with an MPO connector) on the side of the ribbon 12 that corresponds to Fiber 1. These placements result in the body marks 18, 18' being positioned on opposite sides of the ribbon 12 (i.e., on opposite sides of the bisecting plane BS and the keys 26, 26'), and the ferrule marks 24, 24' also being positioned on opposite sides of the ribbon 12, with the ferrule and body marks on each end of the cable 10 being on opposite sides of their respective terminal assemblies 15, 15'.

Turning now to FIG. 2, an MPO adapter, designated broadly at 30, is illustrated therein. The adapter 30 includes an opening 31 that passes therethrough. A keyway 32 also extends through the adapter 30 contiguous with the opening 31 and is sized and configured to receive either of the keys 26, 26' from the cable 10 as well as a mating key from another component, such as a fan-out unit. Latches 34 extend slightly into the opening to engage and secure a respective terminal assembly 15, 15'. The exemplary MPO adapters and other array adapters suitable for use with embodiments of the present invention are well-known to those skilled in this art, and their construction and materials need not be described in further detail herein. The exemplary MPO array adapter 30 is described in TIA-604-5B, with the aligned key example described as "key option k=2."

Now referring to FIGS. 3A and 3B, a fan-out unit, designated broadly at 36, includes a ribbon portion 38 comprising optical fibers 39, a transition piece 54, a terminal assembly 37, twelve single fiber connectors 56*a*-56*l*, and a duplex adapter 62. The ribbon portion 38 extends between the terminal assembly 37 and the transition piece 54; from the transition piece 54, the fibers 39 separate or "fan out" into pairs before terminating in respective single fiber connectors 56*a*-56*l* (each of the single fiber connectors 56*a*-56*l* is shown with its alignment key facing upwardly). The pairing of the fibers 39 follows a reverse sequential scheme in which Fibers 1 and 2 are paired on the side of the transition piece 54 adjacent the entry of Fiber 12, Fibers 3 and 4 are paired adjacent Fibers 1 and 2, and so on until Fibers 11 and 12 are paired. The fibers 39 are optically connected with the duplex adapter 62, which includes twelve optical ports 101*a*-101*l* mounted on a faceplate 100 in a linear array 102.

The terminal assembly 37 includes a boot 40, a body 42 and a ferrule 46 like those described above in connection with the cable 10, with the exceptions that the ribbon portion 38, the ferrule 46, the angle polish, and the body 42 are conventionally terminated; as in an exemplary MPO connector, (a) the body mark 44 and ferrule mark 48 are on the same side of the ribbon portion 38 and on the same side as Fiber 1, and (b) although the key 50 projects upwardly from the ferrule 46, the angled contact surface 52 of the ferrule 46 faces slightly downwardly. As discussed below, this orientation of the contact surface 52 enables the terminal assembly 37 of the fan-out unit 36 to mate with the terminal assembly 15 of the cable 10.

The construction of this portion of the fan-out unit 36, including the ribbon portion 38, the transition piece 54, the terminal assembly 37, and the single fiber connectors 56*a*-56*l*, will be well understood by those skilled in this art. An exemplary fan-out unit is available from SYSTIMAX® Solutions, Inc., Richardson, Tex. It will also be understood that fan-out units, such as so-called "hydra" units, that lack a faceplate may also be employed with the present invention, and that the ribbon portion 38 may be replaced with optical fibers in a non-ribbon form.

Turning now to FIGS. 4A-4D, the duplex adapter 62 is mounted on the fan-out unit 36 such that the face plate 100 thereof illustrated in FIGS. 4A-4D faces away from the transition piece 54. The twelve keyed ports 101*a*-101*l* of the duplex adapter 62 receive duplex patch cords 64 (see FIG. 5A and discussion below) and optically interconnect them with the single fiber connectors 56*a*-56*l* (note that the duplex adapter 62 is illustrated as being configured to receive the alignment keys of the single fiber connectors 56*a*-56*l* and the patch cords 64 as they face upwardly). The ports 101*a*-101*l* are arranged such that port 101*a*, which receives single fiber connector 56*a* attached to Fiber 1, is at one end of the linear array 102 and port 101*l*, which receives single fiber connector 56*l* attached to Fiber 12, is at the other end of the array 102.

Adjacent the end 105*a* of the array 102 of ports 101*a*-101*l* (to the far left in FIG. 4A) is visual indicia 103, which indicates the arrangement in which mating optical fibers of the duplex patch cords 64 are to be inserted into the ports 101*a*-101*l*. The visual indicia 103 includes visual indicia 104, in this instance the word "ALPHA," that is disposed at approximately a 45 degree angle to the array 102, with the initial portion of the word being lower than the end portion of the word and the letters being "right side up". The visual indicia 103 also includes visual indicia 106, in this instance the number range "01-12," which indicate the numbers and sequence of the fibers to be inserted into the ports 101*a*-101*l*. The visual indicia 106 is also disposed at approximately a 45 degree angle to the array 102 (i.e., substantially parallel to the visual indicia 104), which the initial portion of the indicia 106 being lower than the end portion and the numbers being "right side up."

At the opposite end 105*b* of the array 102 (to the far right in FIG. 4A) is visual indicia 107, which includes visual indicia 108, in this instance the word "BETA", that is disposed approximately parallel with the visual indicia 104, but with the letters being "upside down." Visual indicia 107 also includes visual indicia 110 (in this instance the number range "01-12"), which is approximately parallel with the visual indicia 108, with the numbers being "upside down."

Figure 4A:
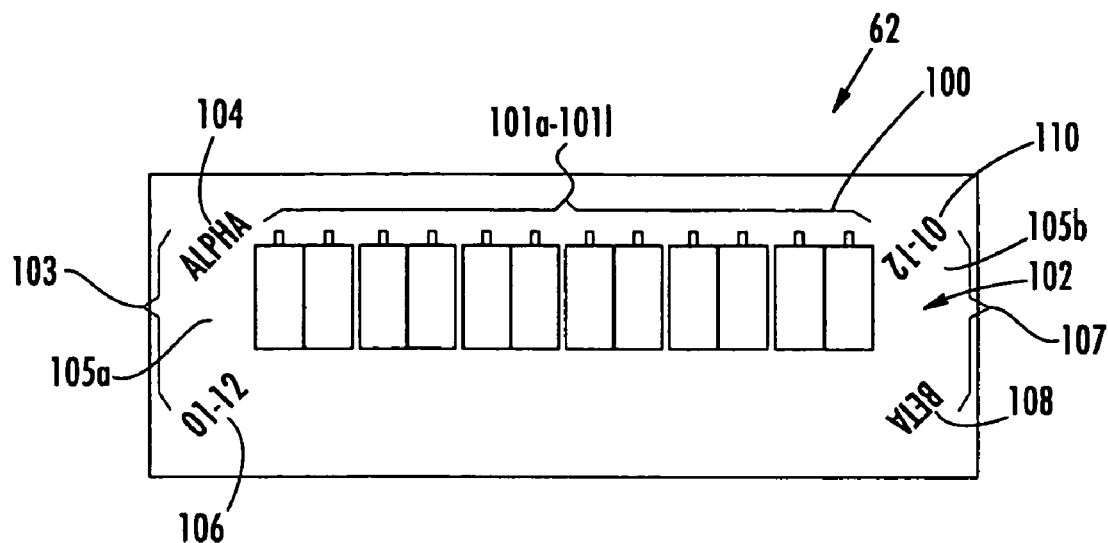
FIGS. 4A-4D are end views of the faceplate of the fan-out unit of FIGS. 3A and 3B shown in four different orientations.

When the face plate 100 is disposed horizontally, as in FIG. 4A, with the end 105*a* on the left side of the duplex adapter 62, each of the visual indicia 104, 106 is "right side up" for easy reading by an operator. The visual indicia 108, 110 are "upside down" in this orientation and are, therefore, more difficult for an operator to read. As such, the operator can easily understand that, in this orientation, the fan-out unit 36 is to be interconnected as an "ALPHA" module.

Figure 4B:
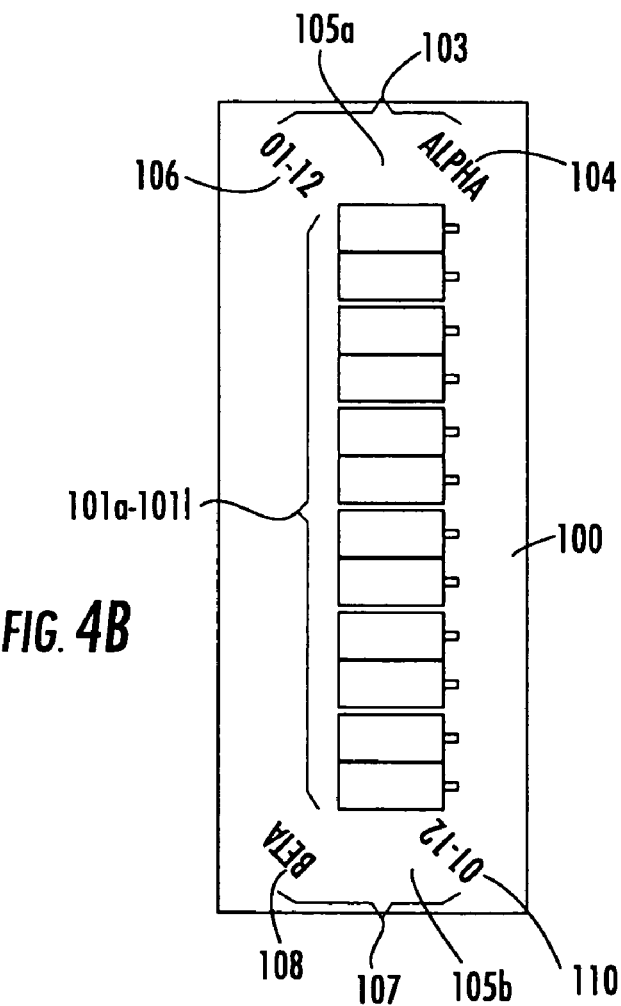

FIG. 4B illustrates the face plate 100 in a vertical orientation, in which the end 105a of the array 102 is at the top of the array 102. In this orientation it can be seen that the visual indicia 104, 106 are disposed at a 45 degree angle to the array 102 such that the initial portions of the word "ALPHA" and the number range "01-12" are higher than the end portions of the word and number range, but such that the visual indicia 104, 106 are "right side up", and the visual indicia 108, 110 are "upside down." In this disposition, the visual indicia 104, 106 can be easily read by an operator, while the visual indicia 108, 110 are not. As a result, an operator can easily discern that, in this orientation, the fan-out unit 36 is to be an "ALPHA" module.

Figure 4C:
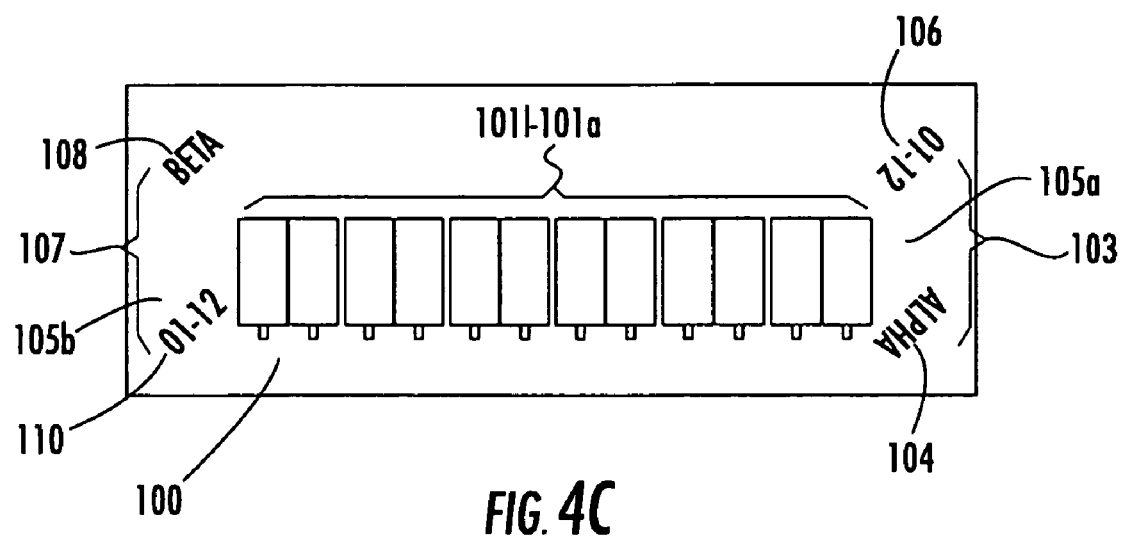

FIG. 4C illustrates the face plate 100 in a horizontal orientation that is rotated 180 degrees from the orientation shown in FIG. 4A. In this orientation, the visual indicia 108, 110 are located on the left side of the array 102 and are "right side up" and can be easily read by an operator, while the visual indicia 104, 106 are located on the right side of the array 102 and are "upside down." As a result, an operator can easily understand that the fan-out unit 36 is to be interconnected as a "BETA" module.

Figure 4D:
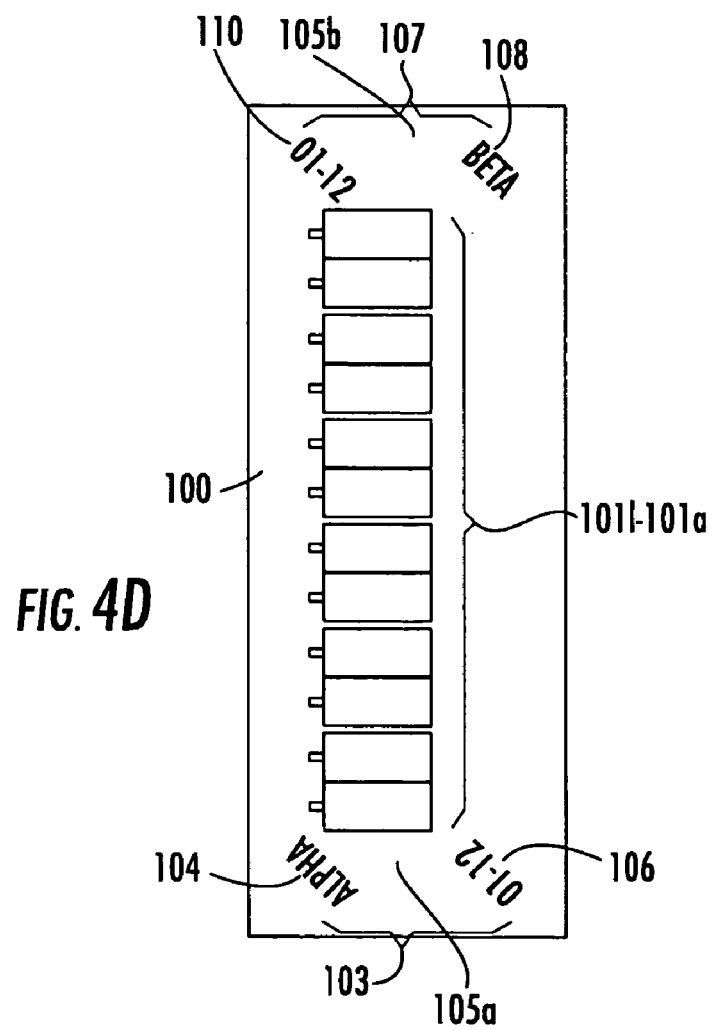

FIG. 4D illustrates the face plate 100 in a vertical orientation that is rotated 180 degrees from the orientation shown in FIG. 4B. In this orientation, the visual indicia 108, 110 are located on the top of the array 102 and are "right side up" for easy reading by an operator, whereas the visual indicia 104, 106 are "upside down." Consequently, an operator can easily recognize that the fan-out unit 36 is to be interconnected as a "BETA" module.

Figure 5A:
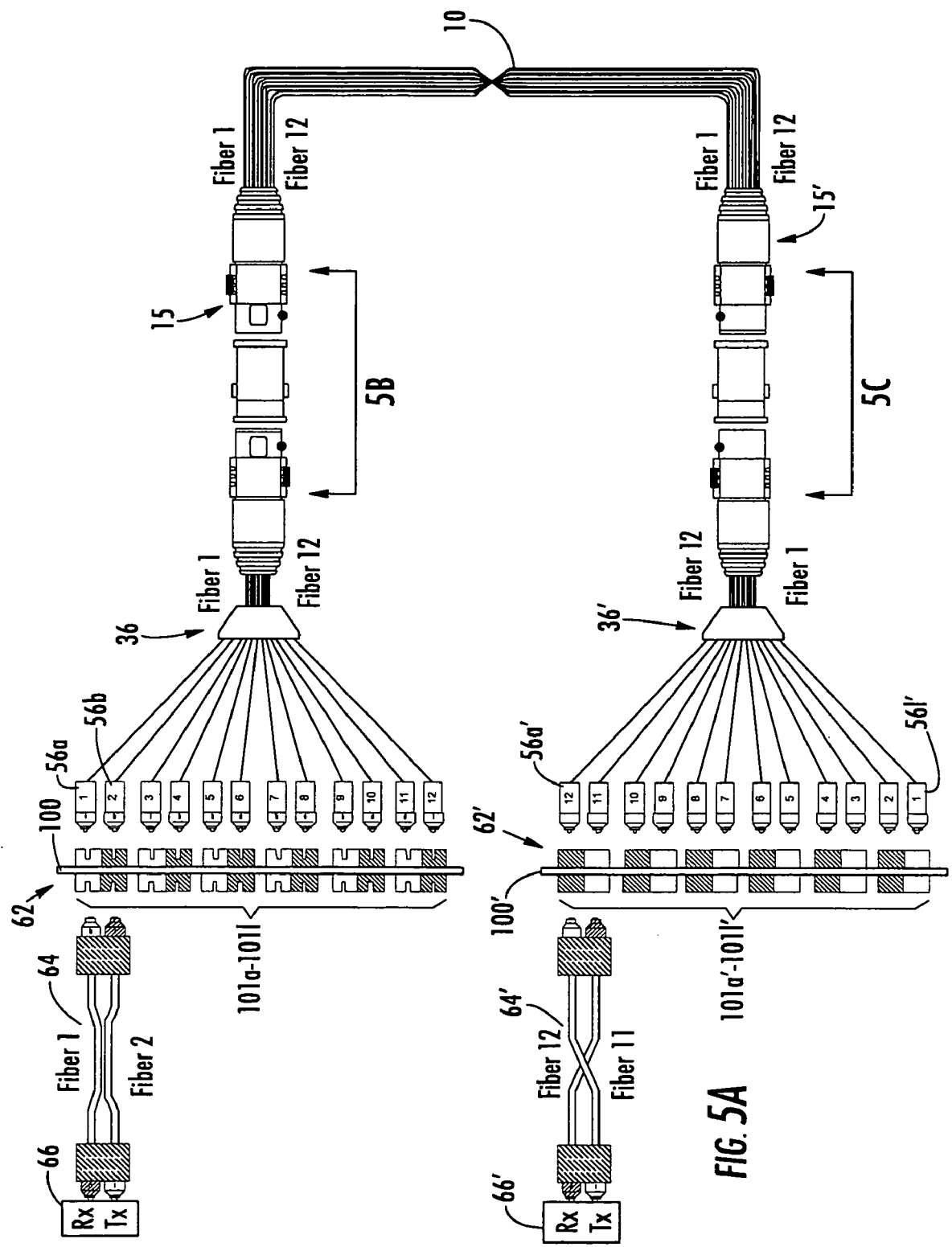
FIG. 5A is a schematic top view of a data transmission system employing a ribbon cable of FIG. 1A.

FIG. 5A illustrates a data transmission system 60 that employs the cable 10, two array adapters 30 and two fan-out units 36, 36' of identical construction of the type described above, but with one fan-out unit 36 being an ALPHA module and the other fan-out unit 36' being a BETA module. The system 60 also includes a number of transceivers 66, 66' located at the far ends of the system 60 (only two transceivers are shown herein for the purpose of clarity). The transceivers 66, 66' may be any number of devices that transmit and receive optical data over optical fiber networks, including computers, telephones, servers and routers. Each transceiver 66, 66' is connected with a corresponding pair of conventional, TIA/EIA-568-B.3 compliant patch cords 64, 64'. The transceivers 66, 66' are connected to the patch cords 64, 64' such that the alignment keys of each are facing upwardly. The patch cords 64, 64' (which in this instance are duplex patch cords, but which in other embodiments may be single fiber cords or other multiple fiber cords) are in turn connected with ports in one of two duplex adapters 62, 62', the construction of each of which is identical and as described above. The single fiber connectors 56a-56l of each fan-out unit 36, 36' plug into a respective duplex adapter 62, 62' in pairs as described above and illustrated in FIGS. 5A-5C. The fan-out units 36, 36' are connected with the terminal assemblies 15, 15' of the cable 10 via the array adapters 30.

Referring to FIG. 5A, it can be seen that the trunk cable 10 includes a "twist" that causes the terminal assembly 15 to be disposed with its alignment key 26 facing upwardly and the terminal assembly 15' to be disposed such that its alignment key 26' faces downwardly. This "twist" can be accomplished in any number of ways; it does not require a physical twisting of the cable 10, but instead simply represents the reversed alignment orientation of the terminal assemblies 15, 15' as they mate with their respective fan-out units 36, 36'. The "twist" also has the effect of reversing the alignment of the fibers 14 in the cable 10 at the terminal assembly 15', such that, with the alignment key 26' extending downwardly, one facing the contact surface 28' of the terminal assembly 15' would view Fiber 12 on the left side of the contact surface 28' and Fiber 1 on the right side of the contact surface 28'.

Although the fan-out units 36, 36' and accompanying duplex adapters 62, 62' are identical in construction, they are connected in optically inverted fashion with the terminal assemblies 15, 15', such that they represent one "ALPHA" module and on "BETA" module for interconnection with the patch cords 64, 64'. As shown in FIG. 5A, all of the alignment keys of the single fiber connectors 56a-56l of the fan-out unit 36 are inserted into the ports 101a-101l of the duplex adapter 62 facing upwardly. Also, Fibers 1-12 of the fan-out unit 36 are aligned in ascending sequential order from left to right from the vantage point of one facing the face plate 100 of the duplex adapter 62. In this arrangement, the visual indicia 104, 106 of the faceplate 100 are positioned on the left side of the faceplate 100 and are "right side up," thereby indicating that this is to be an ALPHA fan-out unit. Thus, the patch cords 64 are inserted into the ports 101a-101l in ascending order (i.e., Fiber 1 in the far left position to mate with Fiber 1 of the fan-out unit 36, and Fiber 12 in the far right position to mate with Fiber 12 of the fan-out unit 36) with their alignment keys facing upwardly.

In contrast, all of the alignment keys of the single fiber connectors 56a'-56l' of the fan-out unit 36' are inserted into the ports of the duplex adapter 62' facing downwardly, and Fibers 1-12 are aligned in descending sequential order from left to right (from the vantage point of one facing the faceplate 100). Comparing this arrangement to FIG. 4C, it can be seen that this orientation of the fan-out module 36' positions the visual indicia 108, 110 on the left side of the faceplate 100 and "right side up," thereby qualifying the fan-out unit 36' as a "BETA" module. Thus, the patch cords 64' are inserted into the ports 101a-101l in ascending order (i.e., Fiber 1 in the far right position to mate with Fiber 12 of the fan-out unit 36', and Fiber 12 in the far right position to mate with Fiber 1 of the fan-out unit 36') with their alignment keys facing downwardly. The patch cords 64' are illustrated with a "twist" between their ends to indicate a "key up to key up" connection with the transceiver 66'.

Figure 5B:
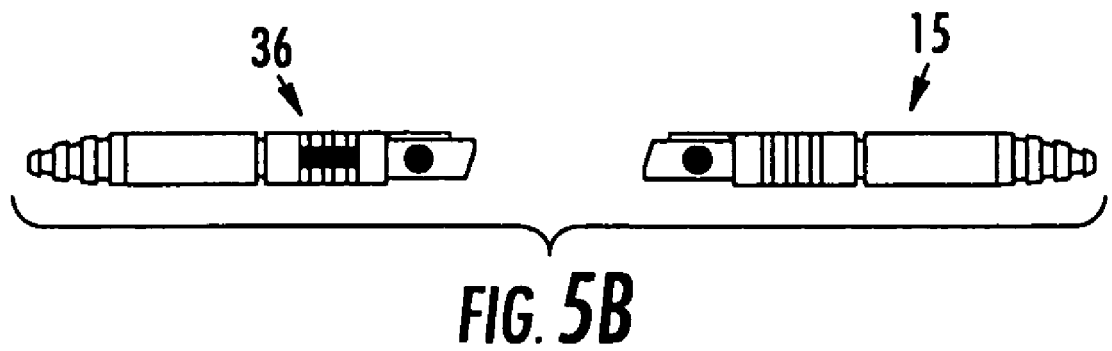
FIG. 5B is a partial side view of a connection between one terminal of the ribbon cable and the fan-out unit of FIG. 5A.
Figure 5C:
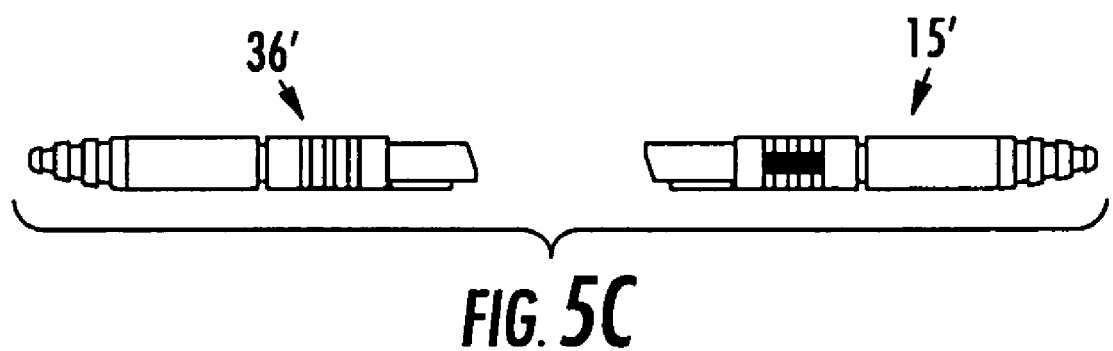
FIG. 5C is a partial side view of a connection between an opposite terminal of the ribbon cable and the fan-out unit of FIG. 5A.

As can be seen in FIGS. 5A and 5B, the connections between the fan-out units 36 and the terminal assemblies 15, 15' of the cable 10 are "key-up to key-up" or "key-down to key-down," which tends to be preferred from a performance standpoint. The configuration described herein enables the angle polished contact surfaces 28, 28' of the terminal assemblies 15, 15' to mate with the angle polished contact surfaces 52 of the fan-out units 36, 36'. The mating of these angled contact surfaces provides transmission of optical data in a manner that is typically better than that of non-angled (i.e., flat) contact surfaces, and does so with a "key up to key up" or "key-down to key-down" orientation of the terminal bodies 18, 18' of the cable 10 and the terminal bodies 42 of the fan-out units 36 (see FIG. 5B). Notably, either of the terminal assemblies 15, 15' can be connected with either of the fan-out units 36, 36' and still be operable.

It can be verified that the system 60 indeed provides proper connectivity for optical signals by tracing the transmission paths between a pair of connected transceivers 66, 66'. Turning to FIG. 5A and beginning with the transmitting portion Tx of the transceiver 66, an optical signal originating there would travel through the patch cord 64 labeled "Fiber 2" to the duplex adaptor 62. The signal would then travel through the signal fiber connector 56b into Fiber 2 of the fan-out assembly 36, which conveys the signal to the array adapter 30. At this point the signal is transmitted through the terminal assembly 15 to Fiber 11 of the cable 10, which is aligned with Fiber 2 of the fan-out assembly 36. The signal travels through the cable 10 in Fiber 11 to the terminal assembly 15', through the second array adapter 30, and into the second fan-out unit 36', where the signal is transmitted to Fiber 11 thereof. The signal then travels in Fiber 11 of the second fan-out unit 36' through the single fiber connector 56b', the duplex adapter 62', Fiber 11 of the patch cord pair 64', and into the receiving portion Rx of the transceiver 66'. Thus, the signal is properly transmitted from the transmitting portion of the transceiver 66 to the receiving portion of the transceiver 66'.

Continuing to refer to FIG. 5A, a parallel transmission path can be traced from the transmitting portion Tx of the transceiver 66' to the receiving portion Rx of the transceiver 66. More specifically, the signal travels from the transmitting portion Tx of the transceiver 66' through Fiber 12 of the patch cord pair 64', through the duplex adapter 62' into Fiber 12 of the second fan-out unit 36', through the second array adapter 30 into Fiber 12 of the cable 10, through the first array adapter 30 and into Fiber 1 of the first fan-out unit 36, and through the duplex adapter 62 into Fiber 1 of the patch cord pair 64 for delivery into the receiving portion Rx of the transceiver 66. Thus, it can be seen that the signal is properly transmitted from the transmitting portion Tx of the transceiver 66' to the receiving portion Rx of the transceiver 66.

It will also be understood by those skilled in this art that the cable 10 can be configured such that, rather than the contact surfaces 28 of the ferrules 22, 22' facing slightly upwardly, the ribbon 12 can be oriented such that the contact surfaces 28 face slightly downwardly while the keys 26 still project upwardly. Such a modification would employ fan-out units 36 that have contact surfaces that face slightly upwardly as their keys 50 extend upwardly.

Figure 6A:
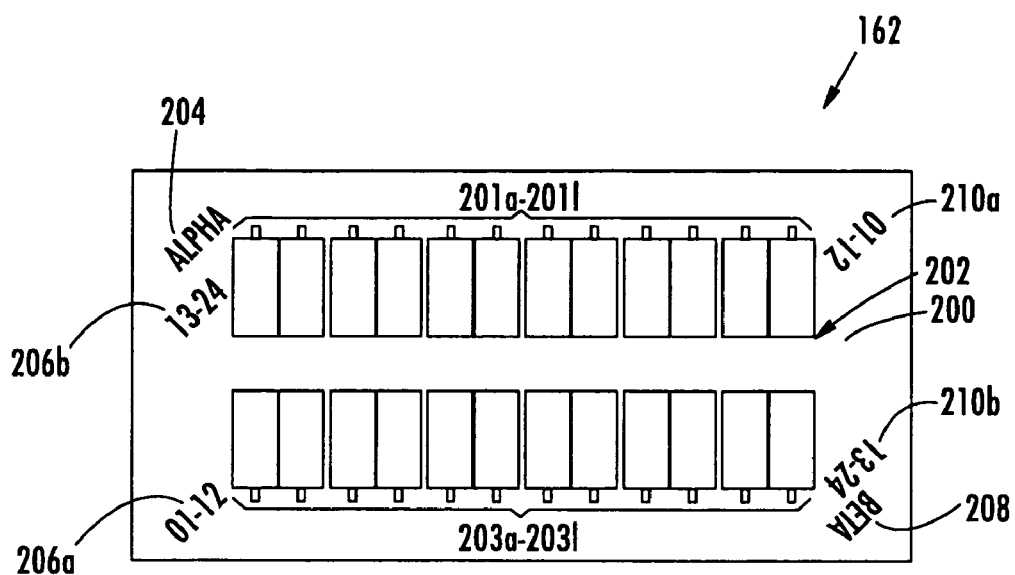
FIG. 6A is an end view of an alternative embodiment of a faceplate of a fan-out unit according to the present invention with the faceplate in a horizontal orientation.
Figure 6B:
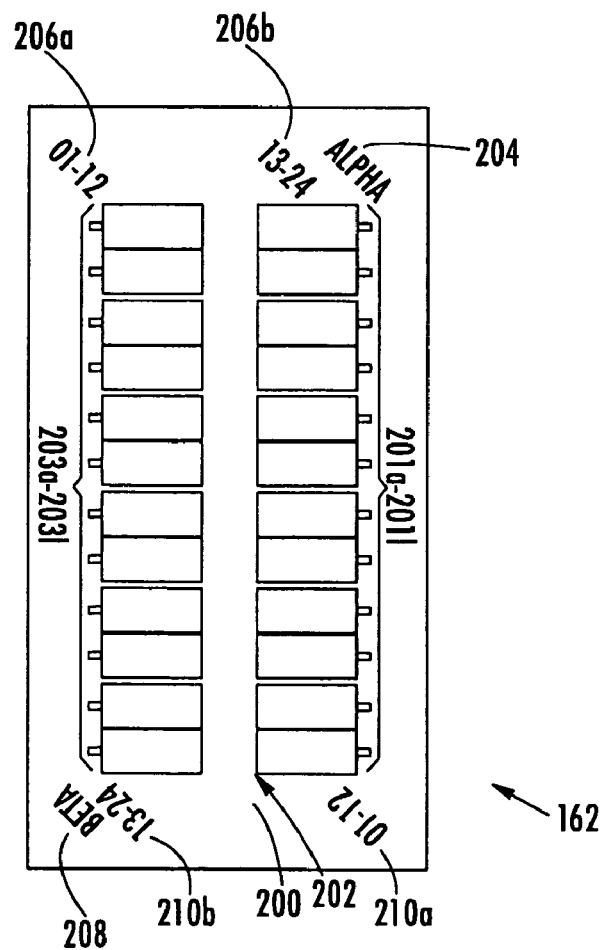
FIG. 6B is an end view of the faceplate of FIG. 6B in a vertical orientation.

Those skilled in this art will also appreciate that the present invention may be employed with multiple fiber optic cables. Referring now to FIG. 6, a duplex adapter 162 having a faceplate 200 is shown therein. The faceplate 200 houses an array 202 of ports 201a-201l and 203a-203l arranged in two rows. In this embodiment, each of the ports 201a-201l is oriented such that it receives an alignment key from a mating connector that extends downwardly, and each of the ports 203a-203l is oriented such that it receives an alignment key from a mating connector that extends upwardly. The faceplate 200 includes visual indicia 204 that, like the visual indicia 104 of faceplate 100, indicates an "ALPHA" module, and further includes visual indicia 206a, 206b that indicate the insertion of Fibers 1-12 in ports 203a-203l in ascending order and the insertion of Fibers 13-24 in ports 201a-201l in ascending order. Visual indicia 208, 210a, 210b are positioned on the opposite end of the faceplate 100 and are analogous to the visual indicia 108, 110 of the faceplate 100. It can be seen that, when the duplex adapter is in the orientation of FIG. 6, the visual indicia 204, 206a, 206b are easily read and inform an operator that this is an ALPHA module, and that the visual indicia 208, 210a, 210b are more difficult to read. The same would be true if the faceplate 200 were rotated 90 degrees clockwise from the position in FIG. 6. However, if the faceplate 200 were rotated 180 or 270 degrees from the position of FIG. 6, the visual indicia 208, 210a, 210b would be more easily read by an operator, who would understand this to be a BETA module.

Those skilled in this art will recognize that, although the faceplate 100 is configured to receive 12 fibers from one cable, and the faceplate 200 is configured to receive 24 fibers from two cables (12 from each cable), faceplates may be configured to receive any number of cables (e.g., four or eight cables). Also, faceplates may be configured to receive different numbers of fibers per cable, although even numbers of fibers (i.e., fibers in pairs) are most typical.

Those skilled in this art will recognize that other data communication systems may also employ trunk cables of the present invention with aligned-key adapters. Exemplary alternative systems include ruggedized array connector-to-single fiber fan-out units replacing the fan-out units 36 and 36', the duplex adapters 62 and 62', and the duplex patch cords 64 and 64' described in FIG. 5A.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as recited in the claims. The invention is defined by the following claims, with equivalents of the claims to be included therein.

The invention claimed is:

1. A fan-out unit for an optical fiber transmission system, comprising:
   a plurality of optical fibers;
   a faceplate with a plurality of ports arranged in at least one row, each of the ports being optically interconnected with a respective one of the optical fibers and configured to receive a mating optical fiber;
   wherein the faceplate includes a first visual indicia associated with the ports that indicates an arrangement in which mating optical fibers are to be inserted into the ports, the first visual indicia being easily readable when the faceplate is in either a first horizontal orientation or a first vertical orientation, but not being easily readable when the faceplate is in a second horizontal orientation that is inverted from the first horizontal orientation or a second vertical orientation that is inverted from the first vertical orientation; and
   further comprising a second visual indicia associated with the ports, the second visual indicia being easily readable when the faceplate is in either the second horizontal orientation or the second vertical orientation, but not being easily readable when the faceplate is in the first horizontal orientation or the first vertical orientation.

2. The fan-out unit defined in claim 1, wherein the first visual indicia comprises text, and wherein the text is oriented on the faceplate such that it is right side up in the first horizontal and first vertical orientations, and is upside down in the second horizontal and second vertical orientations.

3. The fan-out unit defined in claim 2, wherein the first visual indicia is disposed at approximately a 45 degree angle to an axis defined by the row of ports.

4. The fan-out unit defined in claim 3, wherein the first visual indicia includes a text word that identifies the orientation of the faceplate and a number range that indicates the arrangement of the mating fibers in the ports.

5. The fan-out unit defined in claim 1, wherein the faceplate comprises two rows of ports.

6. The fan-out unit defined in claim 1, wherein the first visual indicia includes a text word that identifies the orientation of the faceplate and a number range that indicates the arrangement of the mating fibers in the ports, and wherein the second visual indicia includes a text word that identifies the orientation of the faceplate and a number range that indicates the arrangement of the mating fibers in the ports, and wherein the text words of the first and second visual indicia are different, and the number ranges of the first and second visual indicia are the same.

7. The fan-out unit defined in claim 1, further comprising a termination assembly interconnected with ends of the optical fibers opposite the faceplate, the termination assembly including an alignment key that faces in a first direction, and wherein the ports are configured to receive mating optical fibers that have alignment keys facing in the first direction.

8. The fan-out unit defined in claim 7, wherein the termination assembly includes a ferrule in which the optical fibers are terminated, the ferrule having a contact surface that is disposed at an oblique angle to a plane defined by the optical fibers.

9. The fan-out unit defined in claim 7, wherein the faceplate is mounted on a duplex adapter, and wherein the optical fibers include connectors that are mounted in the ports of the faceplate, and wherein the connectors of the optical fibers have alignment keys that extend in the first direction.

10. A data communication system, comprising:
   first and second transceivers;
   first and second fan-out units, each of which includes a plurality of optical fibers, wherein the first fan-out unit is optically connected with the first transceiver via a first pair of optical patch cords, and the second fan-out unit is optically connected with the second transceiver via a second pair of optical patch cords;
   first and second adapters connected with, respectively, the first and second fan-out units; and
   a fiber optic trunk cable comprising:
      a plurality of generally parallel optical fibers extending in a longitudinal direction and having first and second ends;
      a termination assembly attached at each of the first and second ends of the fibers, each of the termination assemblies connected with, respectively, the first and second adapters;
   wherein each of the first and second fan-out units includes a plurality of ports arranged in at least one row, each of the ports being optically interconnected with a respective one of the optical fibers and with a respective one of the patch cords, and wherein each of the first and second fan-out units includes visual indicia that indicates an arrangement in which the patch cords are to be inserted into the ports, the visual indicia indicating that the second fan-out unit is to be optically inverted relative to the first fan-out unit.

11. The data communications systems defined in claim 10, wherein each of the first and second fan-out units comprises a faceplate, and wherein the visual indicia comprises first visual indicia that is easily readable when the row of ports is in either a first horizontal orientation or a first vertical orientation, but not being easily readable when the faceplate is in a second horizontal orientation that is inverted from the first horizontal orientation or a second vertical orientation that is inverted from the first vertical orientation.

12. The data communication system defined in claim 11, wherein the first visual indicia comprises text, and wherein the text is oriented on the faceplate such that it is right side up in the first horizontal and first vertical orientations, and is upside down in the second horizontal and second vertical orientations.

13. The data communication system defined in claim 12, wherein the first visual indicia is disposed at approximately a 45 degree angle to an axis defined by the row of ports.

14. The data communication system defined in claim 13, wherein the first visual indicia includes a text word that identifies the orientation of the faceplate and a number range that indicates the arrangement of the mating fibers in the ports.

15. The data communication system defined in claim 11, wherein the visual indicia further comprises second visual indicia associated with the ports, the second visual indicia being easily readable when the faceplate is in either the second horizontal orientation or the second vertical orientation, but not being easily readable when the faceplate is in the first horizontal orientation or the first vertical orientation.

16. The data communication system defined in claim 10, wherein the first and second adapters are aligned-key array adapters.

17. The data communication system defined in claim 10, wherein the first and second transceivers are connected with the first and second fan-out units via respective duplex aligned-key adapters.

18. The data communication system defined in claim 10, wherein the termination assemblies include ferrules with contact surfaces, and wherein the contact surfaces are disposed at an oblique angle to a plane normal to the axes of the fibers of the trunk cable.

19. The data communication system defined in claim 18, wherein the oblique angle is about 8 degrees.

20. The data communication system defined in claim 10, wherein the termination assembly at the first end of the optical fibers includes a first body mark and a first ferrule mark on opposite transverse sides of the key, and the termination assembly at the second end of the ribbon includes a second body mark and a second ferrule mark on opposite transverse sides of the key, and wherein the first and second body marks are on opposite transverse sides of the key.

21. The data communication system defined in claim 20, wherein, when viewed facing the contact surface with the key projecting upwardly, each of the first and second body marks is positioned on the left side of the body, and each of the first and second ferrule marks is positioned on the right side of the body.

22. The fan-out unit defined in claim 3, wherein the second indicia is oriented substantially 180 degrees front the first indicia.

23. A faceplate for use in the interconnection of a plurality of optical communication fibers, the faceplate having a plurality of apertures arranged in at least one row corresponding to ports for the optical interconnection of a respective one of the optical fibers and configured to receive a mating optical fiber;
   wherein the faceplate includes a first visual indicia associated with the ports that indicates an arrangement in which mating optical fibers are to be inserted into the ports, the first visual indicia being easily readable when the faceplate is in either a first horizontal orientation or a first vertical orientation, but not being easily readable when the faceplate is in a second horizontal orientation that is inverted from the first horizontal orientation or a second vertical orientation that is inverted from the first vertical orientation; and
   further comprising a second visual indicia associated with the ports, the second visual indicia being easily readable when the faceplate is in either the second horizontal orientation or the second vertical orientation, but not being easily readable when the faceplate is in the first horizontal orientation or the first vertical orientation.

* * * * *

UNITED STATES PATENT AND TRADEMARK OFFICE
CERTIFICATE OF CORRECTION

PATENT NO.       : 7,416,347 B2                                           Page 1 of 1
APPLICATION NO.  : 11/440622
DATED            : August 26, 2008
INVENTOR(S)      : Livingston et al.

It is certified that error appears in the above-identified patent and that said Letters Patent is hereby corrected as shown below:

On the Title Page:
Item 56, References Cited: Please correct "6,597,648"
                To read -- 6,597,845 --

In the Claims:
Column 12, Claim 22, Line 41: Please correct "180 degrees front"
                To read -- 180 degrees from --

Signed and Sealed this

Eighteenth Day of November, 2008

JON W. DUDAS
*Director of the United States Patent and Trademark Office*

UNITED STATES PATENT AND TRADEMARK OFFICE
CERTIFICATE OF CORRECTION

PATENT NO.        : 7,416,347 B2                                       Page 1 of 1
APPLICATION NO.   : 11/440622
DATED             : August 26, 2008
INVENTOR(S)       : Livingston et al.

It is certified that error appears in the above-identified patent and that said Letters Patent is hereby corrected as shown below:

In the Claims:
Column 11, Claim 8, Line 10: Please correct "claim 7" to read -- claim 1 --

Signed and Sealed this

Twenty-third Day of June, 2009

JOHN DOLL
*Acting Director of the United States Patent and Trademark Office*